United States Patent
Iguchi

(10) Patent No.: US 9,773,291 B2
(45) Date of Patent: Sep. 26, 2017

(54) RENDERING PROCESSOR

(71) Applicant: CANON KABUSHIKI KAISHA, Tokyo (JP)

(72) Inventor: Masayuki Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 14/105,415

(22) Filed: Dec. 13, 2013

(65) Prior Publication Data

US 2014/0098112 A1    Apr. 10, 2014

Related U.S. Application Data

(63) Continuation of application No. 13/108,085, filed on May 16, 2011, now Pat. No. 8,633,935.

(30) Foreign Application Priority Data

Jun. 14, 2010    (JP) .................. 2010-135509

(51) Int. Cl.
   *G06T 1/20*    (2006.01)
   *G06F 9/50*    (2006.01)

(52) U.S. Cl.
   CPC .............. *G06T 1/20* (2013.01); *G06F 9/5011* (2013.01); *G06F 2209/5017* (2013.01)

(58) Field of Classification Search
   None
   See application file for complete search history.

(56) References Cited

U.S. PATENT DOCUMENTS

| | | | |
|---|---|---|---|
| 6,701,420 B1 * | 3/2004 | Hamilton | G06F 12/023 707/999.202 |
| 7,075,541 B2 * | 7/2006 | Diard | G06T 15/005 345/502 |
| 7,522,167 B1 | 4/2009 | Diard et al. | |
| 2009/0273603 A1 | 11/2009 | Johnson | |
| 2010/0149195 A1 * | 6/2010 | Fernando | G06F 9/505 345/505 |
| 2010/0220098 A1 | 9/2010 | Holler et al. | |

FOREIGN PATENT DOCUMENTS

| | | |
|---|---|---|
| JP | 09-167243 A1 | 6/1997 |
| JP | 3809284 B2 | 8/2006 |

* cited by examiner

*Primary Examiner* — Kumar Patel
*Assistant Examiner* — Richard M Russell
(74) *Attorney, Agent, or Firm* — Fitzpatrick, Cella, Harper & Scinto

(57) ABSTRACT

A main processor collects the edge information and color information of the pixels of a rendering target image using a rendering command, and sends the collected edge information and color information of the pixels to a sub-processor of the succeeding stage. The sub-processor sends the edge information and color information of a left rectangular region to a sub-processor, and also renders a right rectangular region and, upon receiving a process wait signal from the sub-processor, sends the rendering result to the sub-processor. The sub-processor renders the left rectangular region and sends the rendering result to the outside, and also sends, to the outside, the rendering result of the right rectangular region acquired by sending a process wait signal to the sub-processor.

11 Claims, 4 Drawing Sheets

RENDERING PROCESSOR

This application is a continuation of application Ser. No. 13/108,085, filed May 16, 2011.

BACKGROUND OF THE INVENTION

Field of the Invention

The present invention relates to an image rendering technique.

Description of the Related Art

Patent references 1 (Japanese Patent No. 03809284) and 2 (Japanese Patent Laid-Open No. 09-167243) disclose methods of causing renderers that process rendering commands described in the vector graphics language to parallelly process the rendering commands for the purpose of speeding up the process or distributing the load. Patent reference 1 discloses a method of transferring rendering commands to renderers via a common bus and causing the renderers to parallelly process images. Patent reference 2 discloses a method of dividing a rendering region into bands and parallelly processing the bands.

As the resolution of graphics rises, a technique of parallelly processing rendering commands is used. In the conventional method, however, the arrangement for outputting graphics in a correct order by controlling the rendering command processing timing and the rendering result output order is complex, and the cost thereof is high.

In the technique disclosed in patent reference 1, each renderer outputs a rendering command acquisition request to the main memory. If the requests collide, control is done to output a high-priority rendering command to be processed first to the common bus so as to transfer it to the corresponding renderer. When outputting rendering results processed by the renderers to the common bus as well, the output order is controlled not to cause collision. For this reason, the processing load of hardware is heavy. In addition, when a renderer has completed a low-priority image process to be output later before a high-priority image process to be output first from another renderer, the generated image needs to be temporarily stored in the local memory. The memory cost for it is high.

In the technique disclosed in patent reference 2, the rendering region of one frame is segmented in the horizontal direction and thus divided into a plurality of band images. The band images are parallelly processed, and the band image rendering result is output sequentially from the preceding stage. However, the time needed to render the band image changes depending on the degree of complexity. Hence, depending on circumstances, each generated band image needs to be held up to the end of the process of the band image of the preceding stage. Furthermore, since the process is performed for each band image, the memory cost is slightly lower than that when holding data of one frame. Instead, process assignment to the band images and the order control are more complex than that when processing each frame.

SUMMARY OF THE INVENTION

The present invention has been made in consideration of the above-described problems, and provides a technique of, when rendering an image using a plurality of renderers, implementing the rendering process by a simpler method.

According to the first aspect of the present invention, there is provided a rendering processor comprising a main processor, a first sub-processor that processes information output from the main processor, and a second sub-processor that processes information output from the first sub-processor, the main processor comprising: a unit that acquires a rendering command of a rendering target image; a collection unit that collects edge information and color information of pixels of the rendering target image using the rendering command; a division unit that segments the rendering target image into two rectangular regions in a vertical line direction, and when the segmented rectangular regions are defined as a first rectangular region and a second rectangular region from right to left of the image, divides each horizontal line of the rendering target image into a first segment line belonging to the first rectangular region and a second segment line belonging to the second rectangular region; and an output unit that outputs, for each horizontal line of the rendering target image, edge information and color information of pixels of the first segment line and the second segment line to the first sub-processor, the first sub-processor comprising: a first transfer unit that outputs, out of the edge information and the color information of the pixels output from the output unit, edge information and color information of pixels of each segment line serving as the second segment line to the second sub-processor; a first rendering unit that renders the first segment line using, out of the edge information and the color information of the pixels output from the output unit, edge information and color information of pixels of the first segment line; and a first output unit that outputs a rendering result by the first rendering unit to the second sub-processor, and the second sub-processor comprising: a second rendering unit that renders the second segment line using the edge information and the color information of the pixels of the second segment line output from the first sub-processor; and a second output unit that outputs the rendering result output from the first sub-processor and a rendering result by the second rendering unit.

According to the second aspect of the present invention, there is provided a rendering processor comprising a main processor, a first sub-processor that processes information output from the main processor, and an (i+1)th (i=1, 2, . . . , N−1) sub-processor that processes information output from an ith sub-processor, the main processor comprising: a unit that acquires a rendering command of a rendering target image, which is described in a graphics language; a collection unit that collects edge information and color information of pixels of the rendering target image using the rendering command; a division unit that segments the rendering target image into N rectangular regions in a vertical line direction, and when the segmented rectangular regions are defined as a first rectangular region, a second rectangular region, . . . , and an Nth rectangular region from right to left, divides each horizontal line of the rendering target image into a first segment line belonging to the first rectangular region, a second segment line belonging to the second rectangular region, . . . , and an Nth segment line belonging to the Nth rectangular region; and an output unit that outputs, for each horizontal line of the rendering target image, edge information and color information of pixels of the first segment line, edge information and color information of pixels of the second segment line, . . . , and edge information and color information of pixels of the Nth segment line to the first sub-processor upon receiving a signal representing an output permission from the first sub-processor, the first sub-processor comprising: a first transfer unit that outputs, out of the edge information and the color information of the pixels of each of the first segment line, the second segment line, . . . , and the Nth segment line output from the output unit in response to transmitting a signal representing an output permission to the main processor, edge information and color information of pixels of each of the second segment line to the Nth segment line to the second sub-processor; a first rendering unit that renders the first segment line using, out of the edge information and the color information of the pixels of each of the first segment line, the second segment line, . . . , and Nth segment line output from the output unit, edge information and color information of pixels of the first segment line; and a first output unit that outputs a rendering result by the first rendering unit to the second sub-processor upon receiving a signal representing an output permission from the second sub-processor, the ith (i≠N) sub-processor comprising: a second transfer unit that receives edge information and color information of pixels of each of an ith segment line to the Nth segment line output from an (i−1)th sub-processor and outputs edge information and color information of pixels of each of an (i+1)th segment line to the Nth segment line to the (i+1)th sub-processor; a second rendering unit that renders the ith segment line using, out of the edge information and the color information of the pixels of each of the ith segment line to the Nth segment line output from the (i−1)th sub-processor, edge information and color information of pixels of the ith segment line; and a second output unit that, upon receiving a signal representing an output permission from the (i+1)th sub-processor, outputs a rendering result output from the (i−1)th sub-processor in response to transmitting a signal representing an output permission to the (i−1)th sub-processor and a rendering result by the second rendering unit to the (i+1)th sub-processor, and the Nth sub-processor comprising: a third rendering unit that renders the Nth segment line using the edge information and the color information of the pixels of the Nth segment line output from the (N−1)th sub-processor; and a third output unit that outputs a rendering result output from the (N−1)th sub-processor in response to transmitting a signal representing an output permission to the (N−1)th sub-processor and a rendering result by the third rendering unit.

Further features of the present invention will become apparent from the following description of exemplary embodiments with reference to the attached drawings.

DESCRIPTION OF THE EMBODIMENTS

An embodiment of the present invention will now be described with reference to the accompanying drawings. Note that the embodiment to be described below is an example of detailed practice of the present invention, and one of detailed examples of arrangements defined in the scope of claims.

First Embodiment

Figure 1:
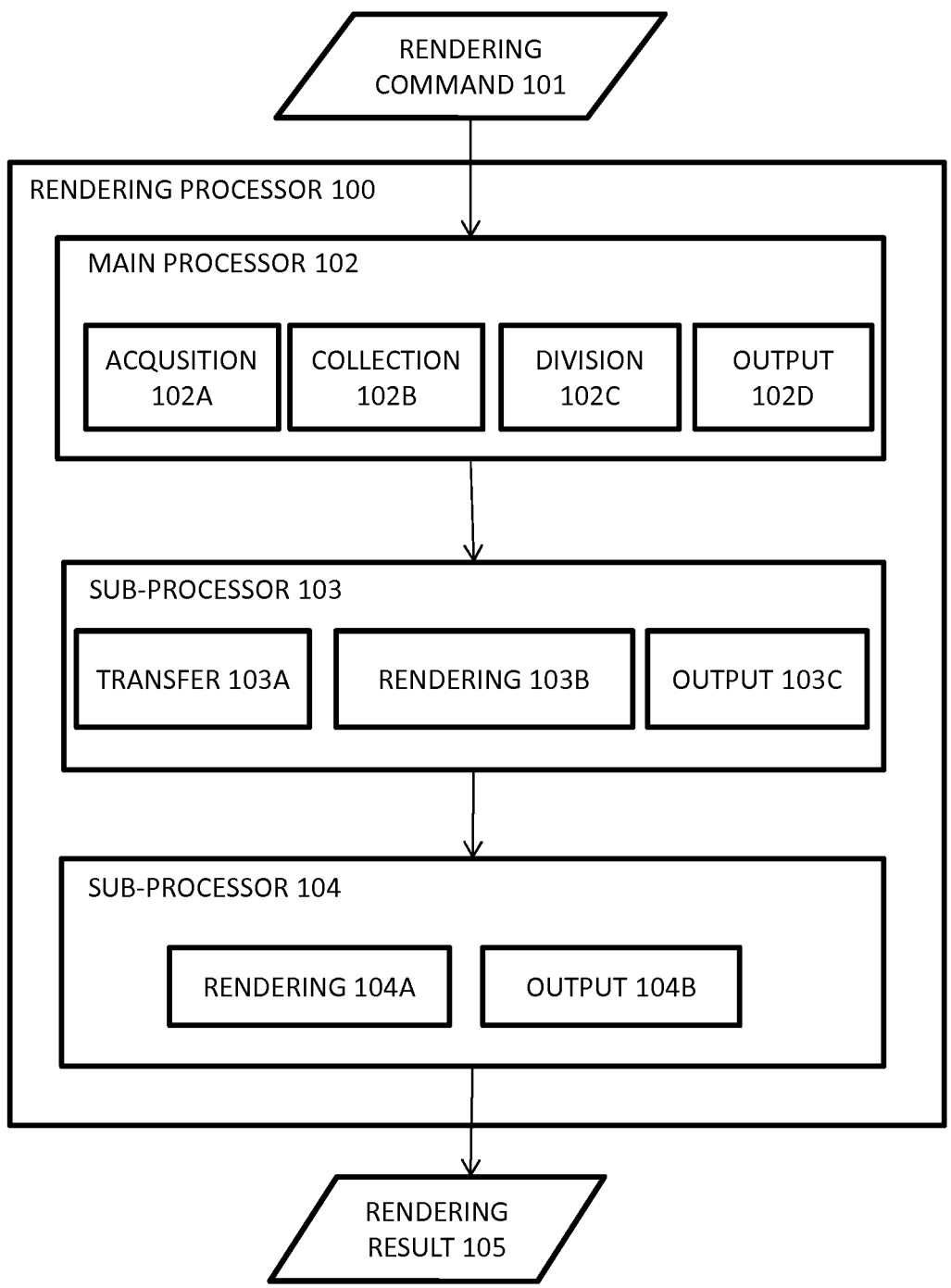
FIG. 1 is a block diagram showing an example of the functional arrangement of a rendering processor 100.

An example of the arrangement of a rendering processor 100 according to this embodiment will be described first with reference to the block diagram of FIG. 1. As shown in FIG. 1, the rendering processor 100 includes a main processor 102, a sub-processor 103 that processes information output from the main processor 102, and a sub-processor 104 that processes information output from the sub-processor 103. The main processor 102 and the sub-processors 103 and 104 are connected in series in the order named to execute pipeline processing. Each of the main processor 102 and the sub-processors 103 and 104 includes a plurality of units, as described in detail below.

First, the main processor 102 will be explained. The main processor acquisition unit 102A receives a rendering command 101 of a rendering target image, which is described in a graphic language such as the vector graphics language. Using the rendering command 101, the main processor collection unit 102B collects the edge information and color information of the pixels of the rendering target image, and sends the collected edge information and color information of the pixels to the sub-processor 103 of the succeeding stage.

The operations of the sub-processors 103 and 104 will be described next. In this embodiment, the number of sub-processors is two (the sub-processor 103 and the sub-processor 104). Hence, in this embodiment, the rendering target image is segmented into two rectangular regions in the vertical line direction so as to cause the sub-processor 103 to render the right rectangular region and the sub-processor 104 to render the left rectangular region.

Figure 2:
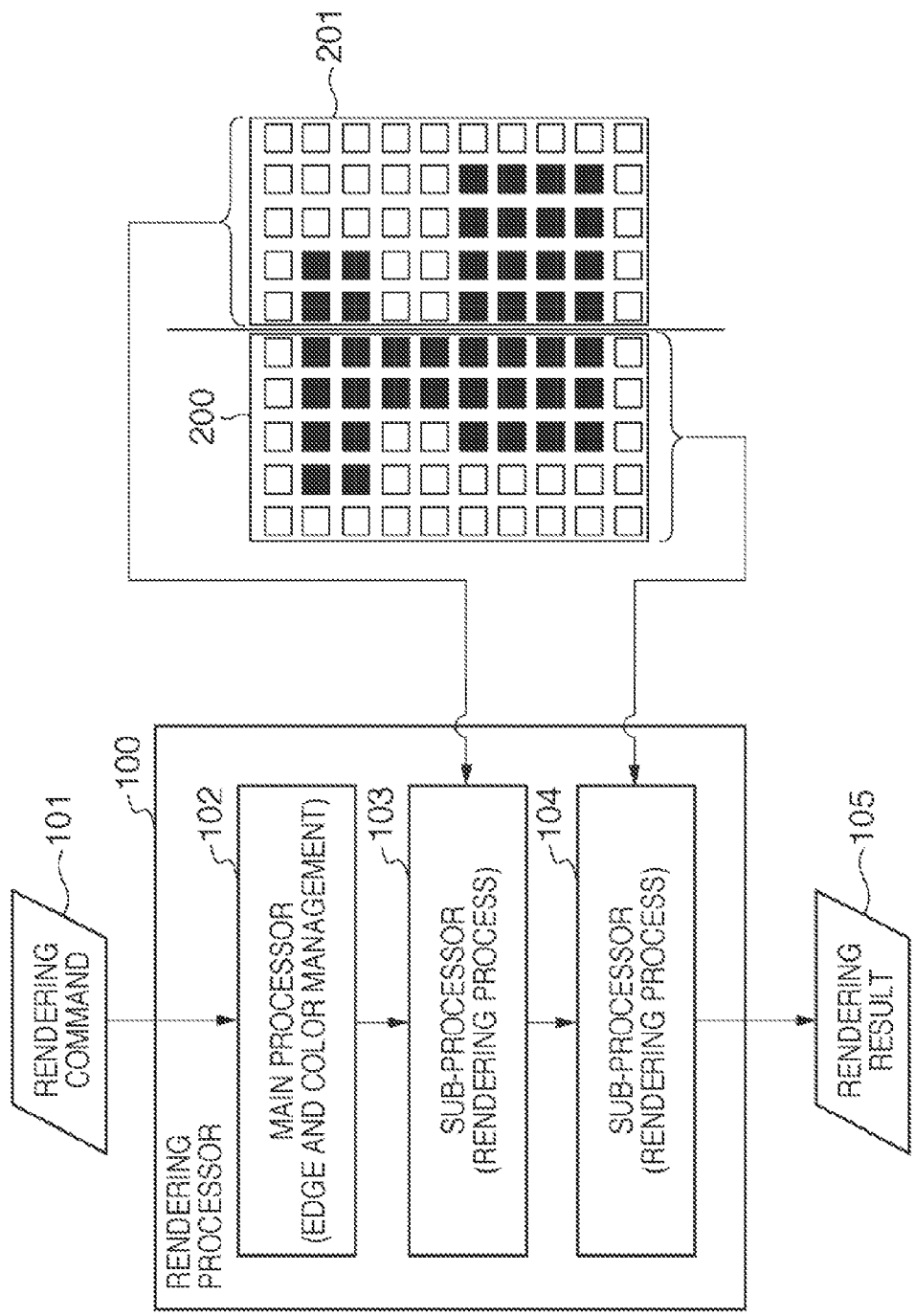
FIG. 2 is a view for explaining rectangular region assignment to sub-processors.

Rectangular region assignment of the sub-processors 103 and 104 will be described with reference to FIG. 2. When the rendering target image is segmented into two rectangular regions 200 and 201 in the vertical line direction, as described above, the right rectangular region 201 is assigned to the sub-processor 103, and the left rectangular region 200 is assigned to the sub-processor 104.

Hence, the sub-processor 103 renders the rectangular region 201 using the edge information and color information of the pixels of the rectangular region 201, whereas the sub-processor 104 renders the rectangular region 200 using the edge information and color information of the pixels of the rectangular region 200.

Figure 3A:
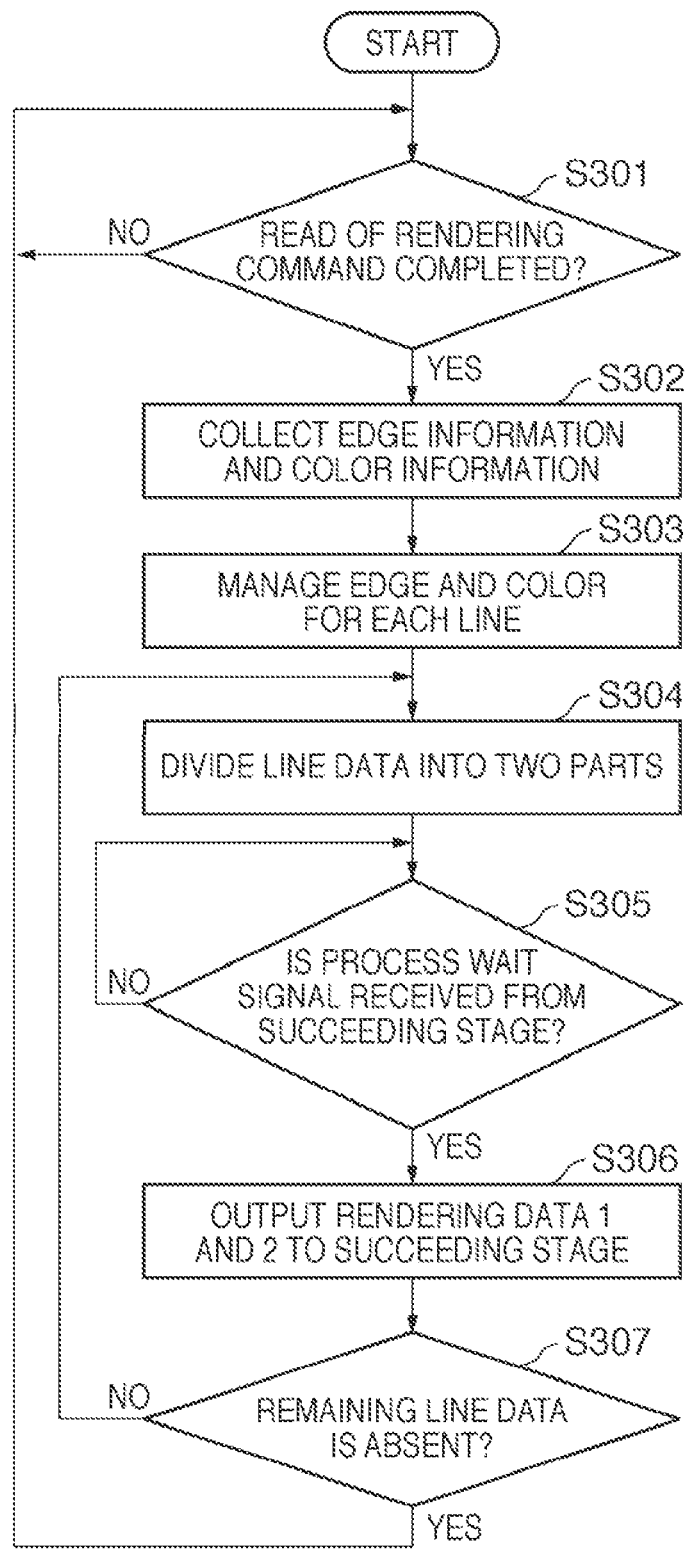
FIGS. 3A to 3C are flowcharts of the operations of a main processor 102 and sub-processors 103 and 104.
Figure 3B:
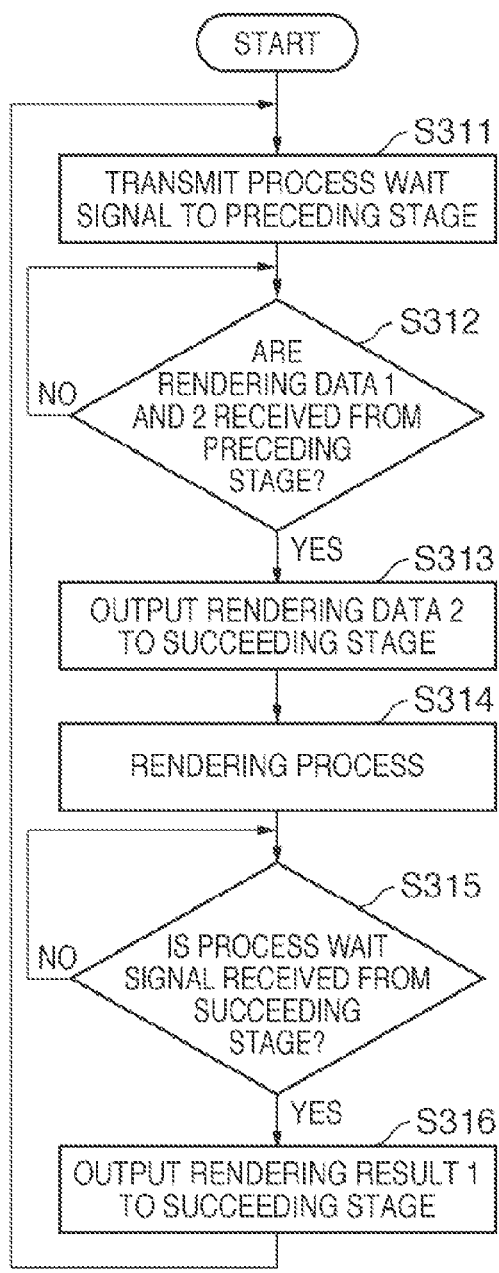
Figure 3C:
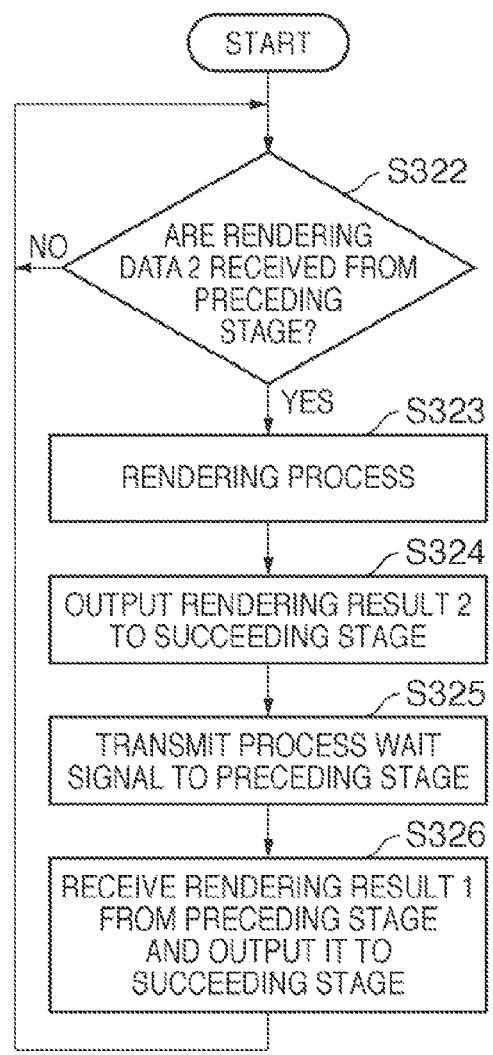

The operations of the main processor 102 and the sub-processors 103 and 104 will be described next with reference to the flowcharts of FIGS. 3A to 3C. The operation of the main processor 102 will be explained first with reference to the flowchart of FIG. 3A.

In step S301, the main processor acquisition unit 102A acquires a rendering command that describes various commands and the like to be used to render the rendering target image from an external device (for example, an external apparatus or memory), and determines whether the acquisition process is completed. Upon determining that the process is completed, the process advances to step S302. If the process is not completed yet, the process returns to step S301 to acquire an unacquired command.

In step S302, the main processor collection unit 102B collects the edge information and color information of the pixels of the rendering target image using the acquired rendering command. For example, the main processor 102 renders the rendering target image on the memory of its own based on the acquired rendering command, and collects the edge information and color information of the pixels included in the rendered rendering target image. The method of collecting edge information and color information is not limited to this, as a matter of course. If the edge information and color information of the pixels are directly described in the rendering command, the described edge information and color information of the pixels are collected. Note that the edge information represents whether the pixel is included in the edge of an object in the rendering target image.

In step S303, the main processor 102 groups the edge information and color information of the pixels collected in step S302 for each horizontal line of the rendering target image. That is, the edge information and color information of the pixels of the horizontal lines are managed for each horizontal line.

In step S304, the main processor division unit 102C segments the rendering target image into two rectangular regions in the vertical line direction. The segmented rectangular regions will be defined as a first rectangular region and a second rectangular region from right to left. In this case, the Ith horizontal line (horizontal line I) from the uppermost horizontal line of the rendering target image is divided into a first segment line belonging to the first rectangular region and a second segment line belonging to the second rectangular region. The variable I is initialized to 1 first. Hence, in first step S304, the uppermost horizontal line of the rendering target image is divided into a first segment line belonging to the first rectangular region and a second segment line belonging to the second rectangular region.

That is, in this step, the pixels that constitute the horizontal line I are divided into a pixel group belonging to the first rectangular region (a pixel group that constitutes the first segment line) and a pixel group belonging to the second rectangular region (a pixel group that constitutes the second segment line). In addition, the edge information and color information of the pixels of the horizontal line I are put into groups of the edge information and color information of the pixels of the first segment line of the horizontal line I, and the edge information and color information of the pixels of the second segment line of the horizontal line I.

In step S305, the main processor 102 determines whether a signal (process wait signal) representing an output permission has been received from the sub-processor 103 that is the immediately succeeding stage of the main processor 102. Upon determining that the signal has been received, the process advances to step S306. If the signal is not received, the process returns to step S305 to wait for reception of the process wait signal.

In step S306, the main processor output unit 102D outputs, to the sub-processor 103, the edge information and color information of the pixels of the first segment line of the horizontal line I and the edge information and color information of the pixels of the second segment line of the horizontal line I. The edge information and color information of the pixels of the first segment line of the horizontal line I and the edge information and color information of the pixels of the second segment line of the horizontal line I will sometimes be referred to as rendering data 1 and rendering data 2, respectively, hereinafter.

In step S307, the main processor 102 determines whether the process in steps S304 to S306 has been done for all horizontal lines of the rendering target image. To do this, the main processor determines whether the value of the above-described variable I equals the total number L of horizontal lines of the rendering target image. Upon determining that I<L, the value of the variable I is incremented by one, and the process from step S304 is executed. If I=L, the process returns to step S301 to acquire the next rendering command.

The operation of the sub-processor 103 will be described next with reference to the flowchart of FIG. 3B. In step S311, the sub-processor 103 outputs a signal representing an output permission to the main processor 102 that is the immediately preceding stage of the sub-processor 103. In accordance with the signal output, the main processor 102 outputs rendering data 1 and rendering data 2 in step S306. The sub-processor 103 acquires the output rendering data 1 and rendering data 2.

In step S312, the sub-processor 103 determines whether acquisition of rendering data 1 and rendering data 2 output from the main processor 102 is completed. Upon determining that the acquisition is completed, the process advances to step S313. If the acquisition is not completed, the process returns to step S312 to acquire an unacquired portion.

In step S313, the sub-processor transfer unit 103A transfers rendering data 2 acquired from the main processor 102 to the sub-processor 104 that is the immediately succeeding stage of the sub-processor 103 (first transfer).

In step S314, the sub-processor rendering unit 103B renders the first segment line of the horizontal line I using rendering data 1 acquired from the main processor 102 (first rendering). This rendering result will sometimes be referred to as rendering result 1.

In step S315, the sub-processor 103 determines whether a signal representing an output permission has been received from the sub-processor 104. Upon determining that the signal has not been received, the process returns to step S315 to wait for reception. On the other hand, upon determining that the signal has been received, the process advances to step S316.

In step S316, the sub-processor output unit 103C outputs rendering result 1 to the sub-processor 104 (first output). Since tendering result 1 is the rendering result of one of the two divisions of the horizontal line I, the memory cost needed to hold rendering result 1 is very low.

The operation of the sub-processor 104 will be described next with reference to the flowchart of FIG. 3C. In step S322, the sub-processor 104 determines whether acquisition of rendering data 2 output from the sub-processor 103 is completed. Upon determining that the acquisition is completed, the process advances to step S323. If the acquisition is not completed, the process returns to step S322 to acquire an unacquired portion.

In step S323, the sub-processor rendering unit 104A renders the second segment line of the horizontal line I using rendering data 2 acquired from the sub-processor 103 (second rendering). This rendering result will sometimes be referred to as rendering result 2.

In step S324, the sub-processor output unit 104B outputs rendering result 2 out of the rendering processor 100 (second output). In step S325, the sub-processor 104 outputs a signal representing an output permission to the sub-processor 103 that is the immediately preceding stage of the sub-processor 104. In accordance with the signal output, the sub-processor 103 outputs rendering result 1 in step S316. In step S326, the sub-processor 104 acquires the output rendering result 1, and outputs the acquired rendering result 1 out of the rendering processor 100 (second output).

That is, rendering data 1 and rendering data 2 are outputs as a rendering result 105 in steps S324 and S326. The rendering result 105 corresponds to the rendering result of the horizontal line I. Outputting the rendering results 105 of all horizontal lines of the rendering target image enables to output the rendering result of the rendering target image.

The rendering processor 100 thus implements control to perform a parallel process for each horizontal line and output the rendering result 105 in a correct order. Reception/transfer of rendering data and rendering result of each stage of the pipeline is controlled based on the process wait signal.

This obviates the necessity for monitoring and controlling the state of each stage and enables a multistage pipeline structure of simple control.

Dividing a rendering region into vertical strips and performing the rendering process for the processing capacity of each divided horizontal line allow to minimize the local memory capacity of each stage of the pipeline. In this embodiment, a case in which two sub-processors are used has been described. However, when the sub-processors that execute the rendering process are scalably constructed, the process of graphics of various resolutions can be implemented by same control.

Second Embodiment

In the first embodiment, the operation of the rendering processor 100 including the two sub-processors connected in series after the main processor 102 has been described. In the second embodiment, a rendering processor including a main processor, a first sub-processor that processes information output from the main processor, and an (i+1)th (i=1, 2, . . . , N−1) sub-processor that processes information output from an ith sub-processor will be described.

In this case, the main processor acquires the rendering command of a rendering target image and collects the edge information and color information of the pixels of the rendering target image using the rendering command, as in the first embodiment. The rendering target image is segmented into N rectangular regions in the vertical line direction. The segmented rectangular regions will be defined as a first rectangular region, a second rectangular region, . . . , and an Nth rectangular region from right to left. In this case, the main processor divides each horizontal line of the rendering target image into a first segment line belonging to the first rectangular region, a second segment line belonging to the second rectangular region, . . . , and an Nth segment line belonging to the Nth rectangular region. Upon receiving a signal representing an output permission from the first sub-processor, the main processor operates in the following way. That is, the main processor outputs, for each horizontal line of the rendering target image, the edge information and color information of the pixels of the first segment line, . . . , and the edge information and color information of the pixels of the Nth segment line to the first sub-processor.

The first sub-processor, which functions like sub-processor 103 in FIG. 1, transmits the signal representing the output permission to the main processor, thereby acquiring the edge information and color information of the pixels of each of the first to Nth segment lines output from the main processor. Out of them, the first sub-processor outputs the edge information and color information of the pixels of each of the second to Nth segment lines to the second sub-processor. On the other hand, the first sub-processor renders the first segment line using the edge information and color information of the pixels of the first segment line out of the edge information and color information of the pixels of the first to Nth segment lines. Upon receiving a signal representing an output permission from the second sub-processor, the first sub-processor outputs the rendering result of the first segment line to the second sub-processor (not shown).

The ith (i≠N) sub-processor, which also functions like sub-processor 103 in FIG. 1, receives the edge information and color information of the pixels of each of the ith to Nth segment lines output from the (i−1)th sub-processor. The ith sub-processor then outputs the edge information and color information of the pixels of each of the (i+1)th to Nth segment lines to the (i+1)th sub-processor (second transfer).

The ith sub-processor renders the ith segment line using the edge information and color information of the pixels of the ith segment line (second rendering). Upon receiving a signal representing an output permission from the (i+1)th sub-processor, the ith subprocessor operates in the following way. That is, the ith sub-processor transmits a signal representing an output permission to the (i−1)th sub-processor, thereby outputting the rendering result output from the (i−1)th sub-processor and the rendering result of the ith segment line to the (i+1)th sub-processor (second output). Note that the rendering result output from the (i−1)th sub-processor includes the rendering results of the first to (i−1)th sub-processors.

The Nth sub-processor, which functions like sub-processor 104 in FIG. 1, renders the Nth segment line using the edge information and color information of the pixels of the Nth segment line output from the (N−1)th sub-processor (third rendering). The Nth subprocessor transmits a signal representing an output permission to the (N−1)th sub-processor, thereby outputting the rendering result output from the (N−1)th sub-processor and the rendering result of the Nth segment line (third output).

The second to Nth sub-processors perform the process for all horizontal lines of the rendering target image so that the Nth sub-processor outputs the rendering result of the rendering target image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a! network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135509 filed Jun. 14, 2010 which is hereby incorporated by reference herein in its entirety.

What is claimed is:

1. A processor comprising circuitry configured to:

acquire a rendering command of a rendering target image;

utilize the rendering command to, in a case where the rendering target image is divided into first and second regions, generate first information used for rendering the first region and second information used for rendering the second region; and output the first and second information to a first sub-processor connected to the processor, wherein the first sub-processor transfers the second information to a second sub-processor connected to the first sub-processor, renders a first part of the first region using the first information, and outputs a rendering result of the first part to the second sub-processor in response to reception of a predetermined signal from the second sub-processor, and wherein the second sub-processor renders a second part, corresponding to the first part, of the second region using the second information, outputs a rendering result of the second part without reception of an output control of the rendering result of the second part from an external source, outputs the predetermined signal to the first sub-processor triggered by an output of the rendering result of the second part, and outputs without modification the rendering result of the first part output from the first sub-processor.

2. The processor according to claim 1, wherein the first and second information are edge information and color information of pixels of the rendering target image.

3. The processor according to claim 1, wherein the processor segments the rendering target image into two rectangular regions as the first and second regions in a vertical line direction.

4. The processor according to claim 3, wherein the processor segments the rendering target image into two rectangular regions in the vertical line direction and, where the segmented rectangular regions are defined as the first region and the second region from image right to image left, divides each horizontal line of the rendering target image into a first segment line belonging to the first region and a second segment line belonging to the second region.

5. The processor according to claim 4, wherein, for each horizontal line of the rendering target image, edge information or color information of pixels of the first segment line and the second segment line are output to the first sub-processor.

6. A sub-processor connected to a processor comprising circuitry configured to:
    transfer, after acquiring, for a rendering target image that is divided into first and second regions, first information used for rendering the first region and second information used for rendering the second region, the second information to another sub-processor connected to the sub-processor;
    render a first part of the first region using the first information; and
    output a rendering result of the rendering of the first part to the other sub-processor in response to reception of a predetermined signal from the other sub-processor, and
    wherein the other sub-processor renders a second part, corresponding to the first part, of the second region using the second information, outputs a rendering result of the second part without reception of an output control of the rendering result of the second part from an external source, outputs the predetermined signal to the sub-processor triggered by an output of the rendering result of the second part, and outputs without modification the rendering result of the first part output from the sub-processor.

7. The sub-processor according to claim 6, wherein the first and second information are edge information and color information of pixels of the first region and the second region, respectively, of the rendering target image.

8. The sub-processor according to claim 6, wherein the first and second information are acquired from a main processor connected to the sub-processor, and the sub-processor outputs a signal indicating an output permission of the first or second information to the main processor.

9. A sub-processor connected to another sub-processor comprising circuitry configured to:
    render, after acquiring first information used for rendering a first region for a rendering target image, that is divided into the first region and a second region, from the other sub-processor, a first part of the first region using the first information;
    output a rendering result of the rendering of the first part without reception of an output control of the rendering result of the first part from an external source;
    output a predetermined signal to the other sub-processor triggered by an output of the rendering result of the first part;
    obtain a rendering result of a second part which is output from the other sub-processor in response to transmission of the predetermined signal to the other sub-processor; and
    output without modification the rendering result of the second part, corresponding to the first part, of the second region which is rendered by the other sub-processor.

10. The sub-processor according to claim 9, wherein the first information is edge information and color information of pixels of the rendering target image.

11. The sub-processor according to claim 9, wherein the sub-processor outputs a signal indicating an output permission of the rendering result by the other sub-processor to the other sub-processor.

* * * * *